United States Patent
Wu

(10) Patent No.: US 6,401,140 B1
(45) Date of Patent: Jun. 4, 2002

(54) APPARATUS AND METHOD FOR BOOTING A COMPUTER OPERATION SYSTEM FROM AN INTELLIGENT INPUT/OUTPUT DEVICE HAVING NO OPTION ROM WITH A VIRTUAL OPTION ROM STORED IN COMPUTER

(75) Inventor: Frank L. Wu, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/228,679

(22) Filed: Jan. 12, 1999

(51) Int. Cl.$^7$ ........................ G06F 15/177; G06F 9/445; G06F 3/00
(52) U.S. Cl. .................................. 710/10; 710/8; 713/2
(58) Field of Search ....................... 710/8, 10; 711/102, 711/103; 713/1, 2, 100; 703/23–28

(56) References Cited

U.S. PATENT DOCUMENTS

| | | |
|---|---|---|
| 5,283,872 A | 2/1994 | Ohnishi |
| 5,546,585 A | 8/1996 | Soga |
| 5,603,056 A | 2/1997 | Totani |
| 5,694,583 A * | 12/1997 | Williams et al. ............ 395/500 |
| 6,115,815 A * | 9/2000 | Doragh et al. ................. 713/2 |
| 6,145,078 A * | 11/2000 | Akamatsu ...................... 713/2 |
| 6,158,002 A * | 12/2000 | Kwan et al. ................... 713/2 |

* cited by examiner

Primary Examiner—Thomas Lee
Assistant Examiner—Thuan Du
(74) Attorney, Agent, or Firm—Haynes and Boone, L.L.P.

(57) ABSTRACT

A computer systems implemented with $I_2O$ devices having no Option ROM associated therewith needs to boot an OS from such an $I_2O$ device without restricting the arrangement of the system BIOS boot sequence. A Virtual Option ROM is integrated into the system BIOS boot sequence code so that the BIOS can detect an $I_2O$ device, and then get instructions from the Virtual Option ROM to initialize an $I_2O$ Platform of an $I_2O$ subsystem, wherein the $I_2O$ device resides. Once the communication between the $I_2O$ subsystem and the BIOS is subsequently achieved, the OS can be booted from the $I_2O$ device. Further, by implementing the Virtual ROM, an $I_2O$ device having no real Option ROM attached thereto can also be identified and used as a system boot device in a selective boot process. The initialization process of an IOP is skipped if a non-$I_2O$ bootable device has been found before the detection of an $I_2O$ device during the Power On Self Test.

30 Claims, 4 Drawing Sheets

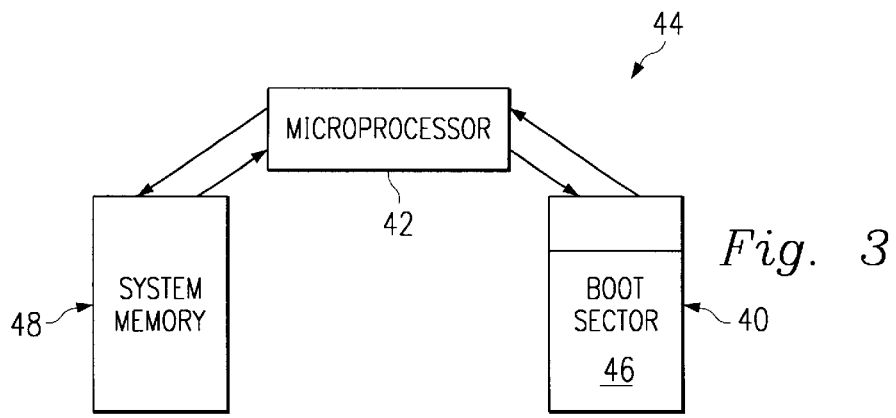
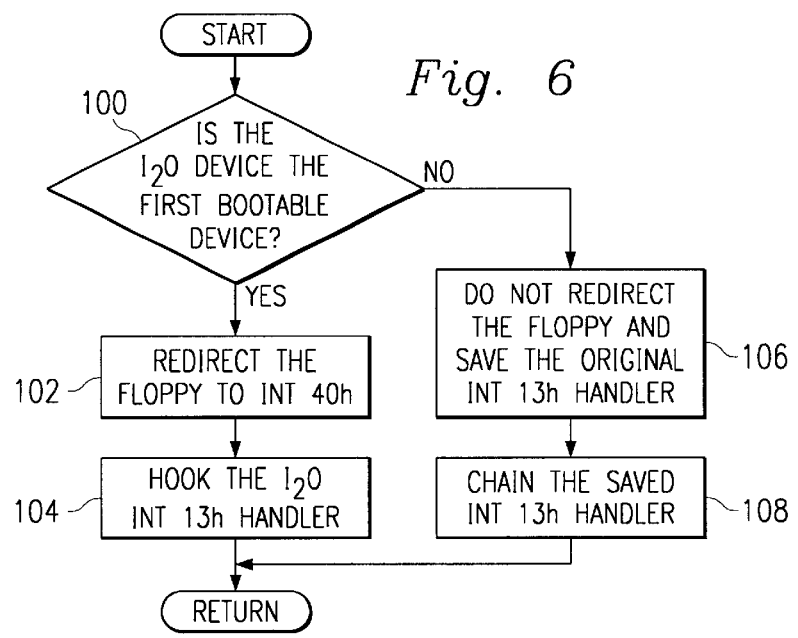
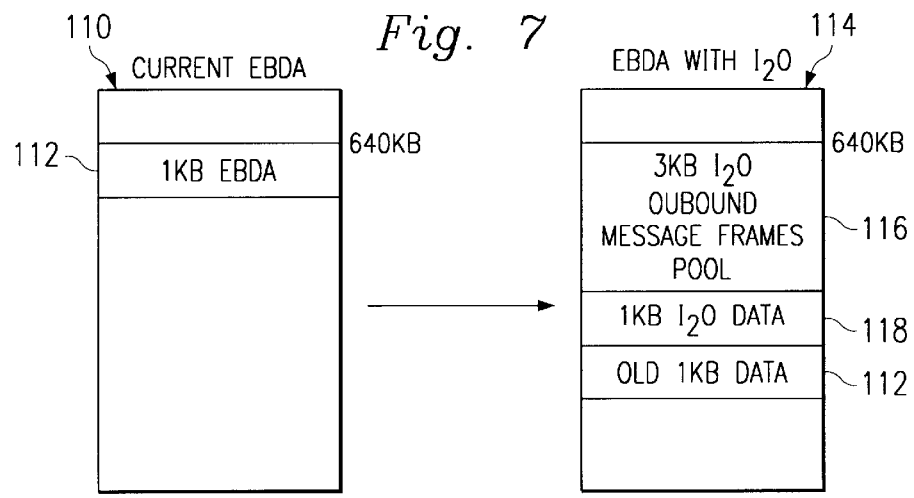

APPARATUS AND METHOD FOR BOOTING A COMPUTER OPERATION SYSTEM FROM AN INTELLIGENT INPUT/OUTPUT DEVICE HAVING NO OPTION ROM WITH A VIRTUAL OPTION ROM STORED IN COMPUTER

BACKGROUND

The disclosures herein relate generally to computer systems supporting the Intelligent Input/Output Architecture Specification, and more particularly, to a booting mechanism enabling the computer systems to boot from an Intelligent Input/Output ($I_2O$) device having no Option ROM attached thereto.

The Intelligent Input/Output Architecture is an open architecture for the development of device drivers that are independent of any specific operation system (OS), processor platform, and I/O system bus. With reference to FIG. 1, conforming to the $I_2O$ Architecture, an $I_2O$ subsystem 10 having a split driver model is split into an Operating System Specific Module (OSM) 11 and a Hardware Device Module (HDM) 12. While the OSM only runs on a host processor 14, the HDM is an Input/Output (I/O) hardware specific module which is unaware of the specific operating system of the host processor. The HDM provides an interface to the I/O adapter and $I_2O$ devices 15 thereunder through an I/O platform subsystem (IOP) 16. Both OSM and HDM modules communicate with each other via a message passing layer 18, such as depicted in FIG. 1. Thus, an $I_2O$ subsystem contains at least one $I_2O$ hardware device ($I_2O$ device) and at least one IOP, which itself includes a processor, memory and $I_2O$ device drivers that are managed independently for the sole purpose of processing I/O transactions. With this relative independence, an $I_2O$ subsystem has various advantages such as reducing the expense for $I_2O$ adapter card vendors to develop and maintain products that support multiple operating systems, simplifying testings of a given $I_2O$ device because of the split driver model isolates functionality, and improving system performance because I/O-intensive functions of the OS are advantageously handled by an independent $I_2O$ subsystem.

In order to boot from an $I_2O$ device in a computer system, the BIOS of the computer system must be prepared at least to recognize bootable $I_2O$ devices. The BIOS must be modified to send, receive, and properly handle $I_2O$ messages as required to initialize and utilize an $I_2O$ device by sending a subset of the complete set of $I_2O$ messages to an IOP. An IOP can be plugged in any system Peripheral Component Interconnect (PCI) bus, and upon system reset, both the BIOS and the $I_2O$ subsystem begin initialization. When the BIOS performs its initialization tasks, it scans the entire PCI bus. An IOP would hold off this scan by retrying the PCI bus configuration access to guarantee that the IOP is fully initialized to the first known state (Init State) while preventing the BIOS from seeing invalid information. Only after the IOP is initialized to the Init State can the BIOS continue the normal PCI bus scan knowing that the communication between the IOP and the BIOS is fully completed. However, an $I_2O$ device without an Option ROM does not permit the IOP to complete an initialization as expected. In such an instance, the BIOS would not establish the communication with the IOP, and consequently would not recognize the $I_2O$ device as an active device. As a result, the OS can not be booted from the $I_2O$ device. Even if an bootable OS disk drive is attached to such an $I_2O$ device, if the $I_2O$ device has no Option ROM, the OS still can not be booted because there has been no initialization of the IOP to establish the communication with the BIOS, and thus the BIOS would still view the $I_2O$ device as an unbootable device.

There are two common methods of booting an OS of a computer system. One is called a sequential boot wherein the BIOS scans from one of the two ends of the PCI bus and boots the OS from the first bootable device. The other is called a selective boot in Setup mode wherein a user can select any bootable device on the PCI bus as the system boot device for booting the OS. In a selective boot, if an $I_2O$ device has no Option ROM attached, it can not be used as a bootable device at all. In a sequential boot, unless an $I_2O$ device is at either end of the PCI bus and the $I_2O$ device has an Option ROM, the only way to boot the OS from an $I_2O$ device, is to "hard code" the BIOS with detailed instructions to use the $I_2O$ device as a boot device regardless of its location on the PCI bus. Only with this arrangement in the BIOS boot sequence, the BIOS can initialize the IOP for the $I_2O$ device.

Turning now to FIG. 2, a process flow of booting the OS from an $I_2O$ device, having no Option ROM attached thereto, by hard coding the BIOS shall now be discussed. Once a computer system is powered up in step 20, the BIOS scans and configures the PCI bus in step 22. The scanning starts from the first PCI bus slot, and the BIOS determines whether the device is an $I_2O$ device, as shown in step 24. If it happens to be an $I_2O$ device, then the $I_2O$ subsystem will be initialized in step 26. In a next step 28, the BIOS further determines whether the $I_2O$ device is bootable device. If it is a bootable device, then $I_2O$ INT 13h handler is hooked immediately in step 30. Either after the device is detected as a non-$I_2O$ device in step 24, or is an unbootable $I_2O$ device but treated as a non-$I_2O$ device in step 28, the BIOS will search for more PCI devices in step 32. After the last PCI bus slot is scanned, a PCI Option ROM will be initialized in step 34. Then, in step 36, without regard to the detected device sequence during the scan, the OS is always to be booted from a bootable $I_2O$ device found in the scan. In other words, even if there is a bootable non-$I_2O$ device detected before an $I_2O$ device during the scan, the BIOS still has to boot from the $I_2O$ device. Obviously, the rigidity of this arrangement does not conform to the Sequential Boot Specification known in the art. Moreover, this arrangement furthermore reduces flexibility of the boot sequence that computer system manufacturers usually expect. For example, a computer system with such an arrangement in the BIOS can not boot the OS from a non-$I_2O$ device during a sequential boot even if the non-$I_2O$ device is located at one end of the PCI bus.

It is thus desirable to provide a computer system that is capable of booting the OS from an $I_2O$ device having no Option ROM to boot from a regular bootable non-$I_2O$ device, such as a PCI SCSI device, without restricting the arrangement of the system BIOS boot sequence. In addition, it is also desirable to use such an $I_2O$ device as a boot device in a selective boot process.

SUMMARY

In order to support $I_2O$ Architecture and conform to the existing Sequential Boot Specification known in the art, what is provided is a computer system supporting an Intelligent I/O architecture having at least one bootable non-Intelligent I/O data storage and including at least one Intelligent I/O subsystem and at least one Intelligent I/O device having no Option ROM associated therewith and residing within the Intelligent I/O subsystem. A data storage detector is provided for identifying the Intelligent I/O device. An Intelligent I/O subsystem initializer configures the Intelligent I/O subsystem. A Virtual Option ROM is stored in a computer system BIOS boot sequence code for enabling the computer system to boot from at least one Intelligent I/O device subsequent to being identified by the data storage detector and the Intelligent I/O subsystem being fully configured by the Intelligent subsystem initializer.

For a computer system installed with $I_2O$ compliant operating system, the embodiments of the present disclosure advantageously skip the initialization process of an IOP if a non-$I_2O$ bootable device has been found before the detection of an $I_2O$ device during the Power On Self Test. In this case, it is rather convenient to let the OS be booted from a non-$I_2O$ bootable device such as a hard disk drive. Once the OS is functional, it can initialize the relevant IOP afterwards in order to utilize the $I_2O$ device thereunder.

BRIEF DESCRIPTION OF THE DRAWINGS

FIG. 3 is an over view of the relationship between a bootable $I_2O$ device, a main microprocessor, and a system memory of a computer system.

FIG. 6 is a flow diagram illustrating the process to complete $I_2O$ INT13h handler hooking according to one embodiment of the present disclosure.

FIG. 7 illustrates the use of the Extended BIOS Data Area (EBDA) for $I_2O$ data buffer and IOP outbound message frame pool.

DETAILED DESCRIPTION

Figure 1:
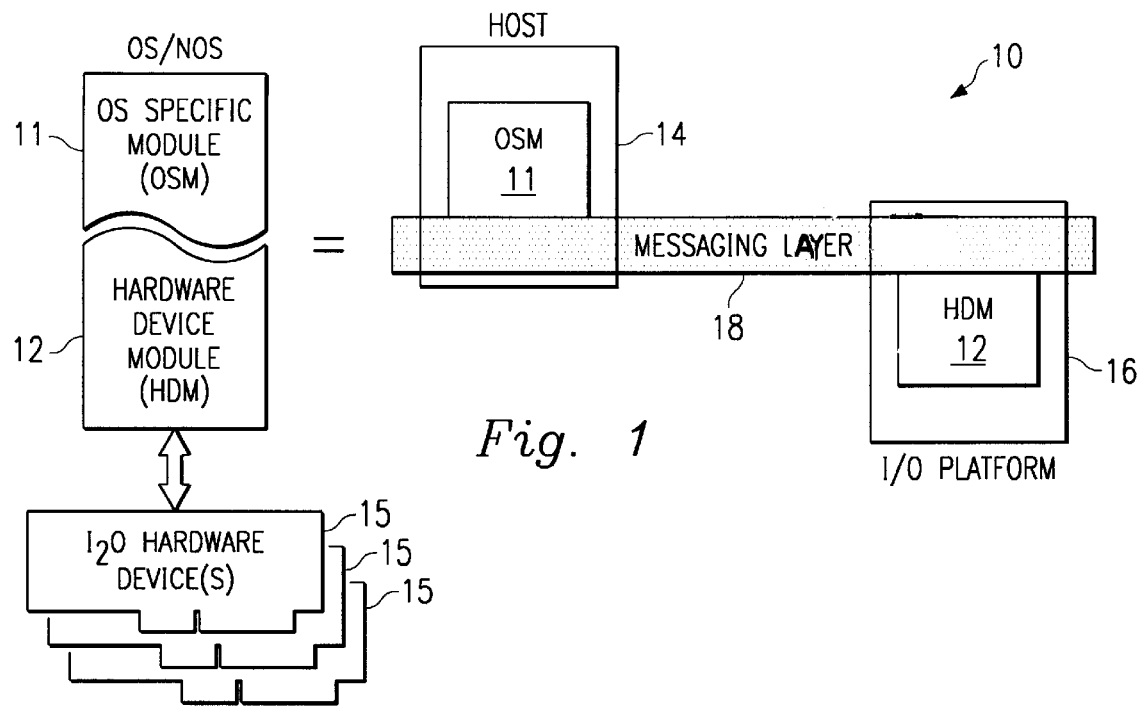
FIG. 1 illustrates the split driver model of the $I_2O$ architecture.

The present disclosure proposes a method to boot an OS of a computer system from an $I_2O$ device having no Option ROM associated therewith. By implementing a Virtual Option ROM in the BIOS, the BIOS can detect the $I_2O$ device, and then get instructions from the Virtual Option ROM to initialize the $I_2O$ subsystem, wherein the $I_2O$ device resides. Accordingly, such an $I_2O$ device can be used as a system boot device just as a regular bootable non-$I_2O$ device, such as a PCI SCSI device.

In general, with reference to FIG. 3, in order to boot the OS from a $I_2O$ device 40, a main microprocessor 42 in a computer system 44 has to retrieve a loader program and system files from an $I_2O$ device's boot sector 46 and copy them to the system memory 48 to construct an OS. Accordingly, in a computer system, wherein at least one $I_2O$ subsystem is integrated, an $I_2O$ aware BIOS sends a subset of the complete set of $I_2O$ messages to an IOP in the $I_2O$ subsystem in order to communicate with the $I_2O$ subsystem. This subset includes minimum message instructions necessary to initialize and configure the IOP, to read from an boot device, i.e., a bootable $I_2O$ device, to execute the OS boot loader, and to continue reading from the system boot device as directed by the boot loader and the OS. Moreover, it is also necessary to be able to write to the device for a full installation of the OS. Thus, if the BIOS is $I_2O$ aware, the BIOS is capable to send, receive, and properly handle $I_2O$ messages to initialize and utilize an $I_2O$ subsystem. Usually, the address for the Inbound Message Port of an IOP is the IOP PCI memory base address offset by 40 h, and the address for the Outbound Message Port is IOP PCI memory base address offset by 44 h. An IOP memory base address is in the system PCI memory space, but mapped to an IOP physical RAM. Accordingly, the BIOS and the IOP share these memory space, and the BIOS can access the shared memory space in the protected mode.

Figure 4:
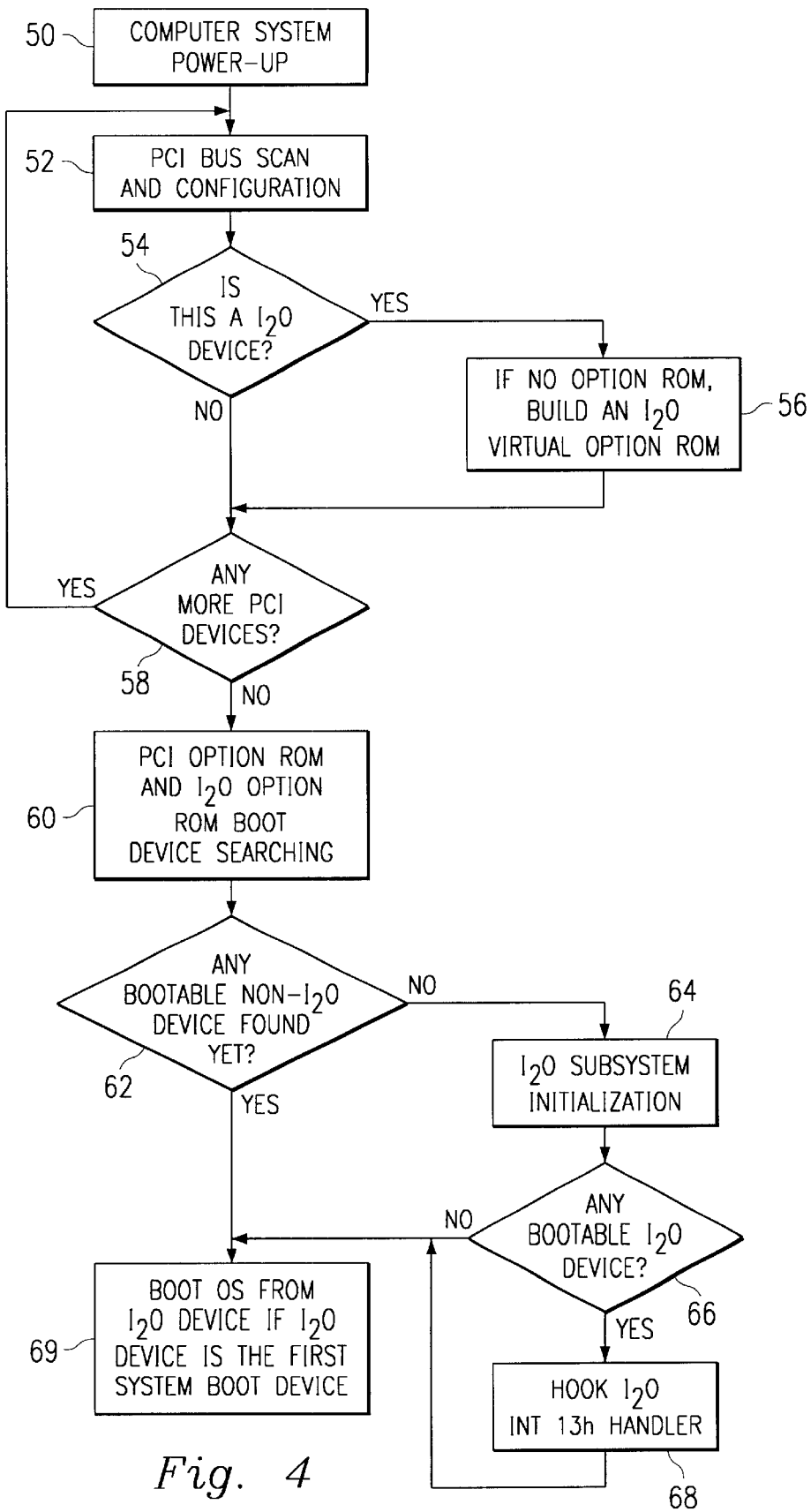
FIG. 4 is a flow diagram depicting the boot sequence for a computer system having an $I_2O$ device with a Virtual Option ROM according to one embodiment of the present disclosure.

Referring now to FIG. 4, a flow diagram depicting the boot sequence flow for an $I_2O$ device with a Virtual Option ROM built in the BIOS according to one embodiment of the present disclosure shall now be discussed. With the implementation of a Virtual Option ROM, an $I_2O$ device having no real Option ROM associated therewith can be used to boot the OS either in a sequential or a selective boot process just as a regular bootable SCSI device. Beginning with step 50, the computer system is powered up. A PCI bus scan and configuration then take place in step 52. As usual, the scanning starts from the first PCI bus slot, and tries to detect an $I_2O$ device in step 54. If the device in the slot is an $I_2O$ device, then instead of immediately shifting to initialize the $I_2O$ subsystem, a Virtual Option ROM is built for the $I_2O$ device if it has no real Option ROM attached thereto (step 56). Once the Virtual Option ROM is established, the scanning continues in step 58. After all the PCI bus slots are scanned, another search is done in step 60 seeking either a PCI or $I_2O$ device with Option ROM. If there is a non-$I_2O$ bootable device found first before any $I_2O$ device in step 62, then the BIOS boots the OS from the found bootable device. This is referred to herein as a speed boot process, which advantageously skips the initialization process of an IOP if a non-$I_2O$ bootable device has been found before the detection of an $I_2O$ device during the Power On Self Test of the computer system. The initialization process of an IOP can last a comparatively long period of time, e.g., three to four minutes, and from a system efficiency point of view, it is not the most efficient way of booting the OS. In this case, it is rather convenient to let the OS be booted from a non-$I_2O$ bootable device such as a hard disk drive. Once the OS is functional, it can initialize the relevant IOP afterwards in order to utilize the $I_2O$ device thereunder.

Figure 2:
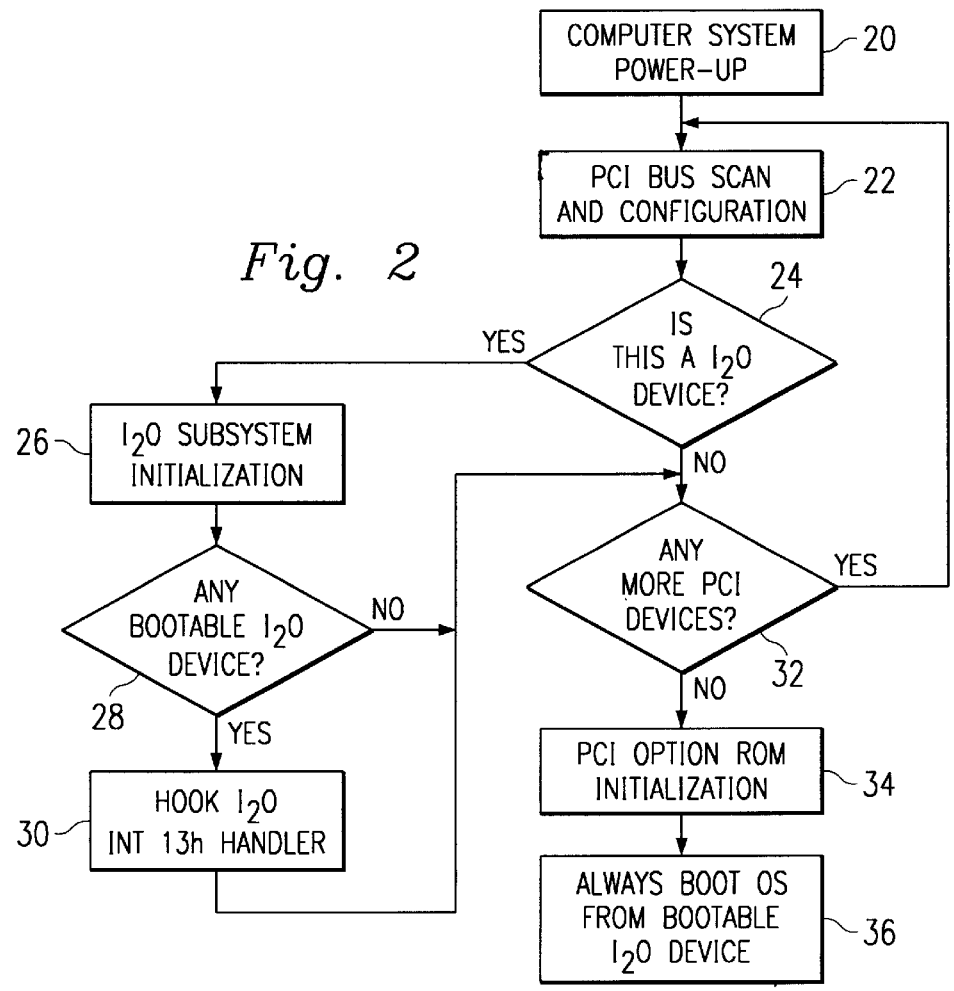
FIG. 2 is a flow diagram depicting a boot sequence for a computer system that includes an $I_2O$ device.

If, in step 62, an $I_2O$ device instead of a bootable non-$I_2O$ device, such as a boot disk drive, happens to be the first device found, then the subsystem will be initialized in steps 64, 66, and 68 in a manner similar to steps 26, 28 and 30 respectively discussed in FIG. 2. As a result, in step 69, the OS will be booted from the $I_2O$ device with the assistance of the established Virtual Option ROM.

Figure 5:
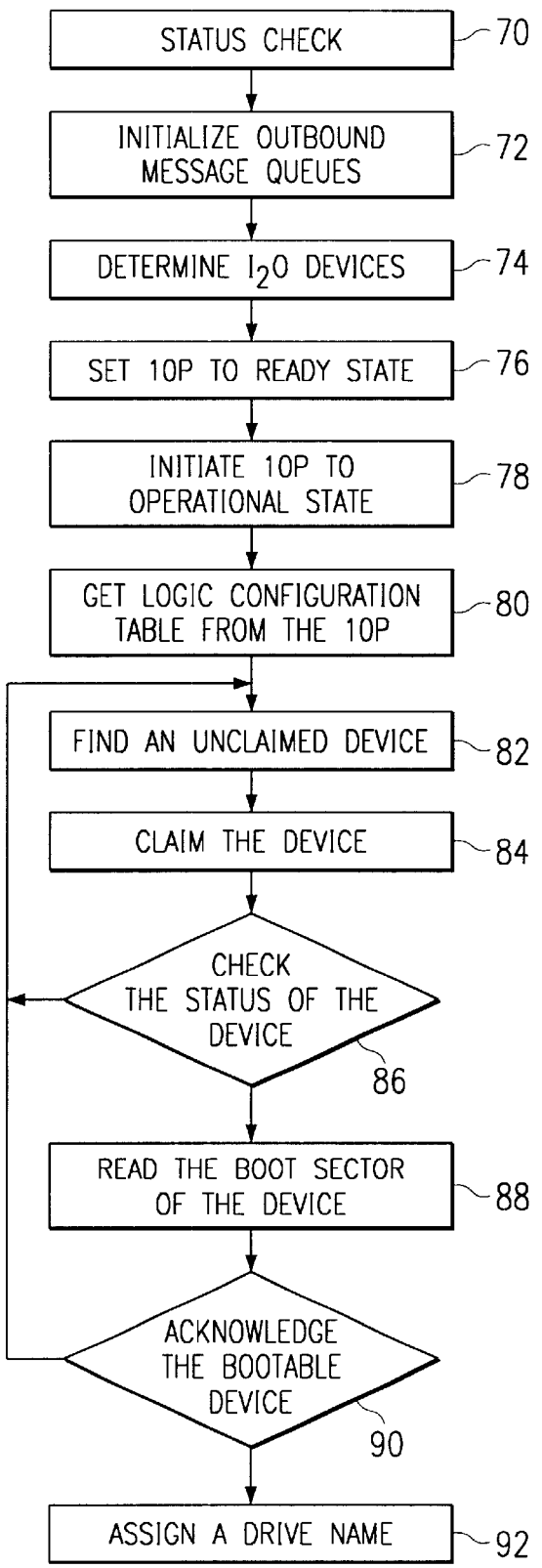
FIG. 5 is a flow diagram depicting detailed steps for $I_2O$ device subsystem initialization according to one embodiment of the present disclosure.

Turning now to FIG. 5, a flow diagram for $I_2O$ subsystem initialization is shown to explain the detailed steps taken in step 64 of FIG. 4. The BIOS starts the initialization in step 70. Preliminary initialization process must be taken to locate the IOP's memory mapped for Inbound Message Port and Outbound Message Port. The BIOS can read the IOP's Inbound Message Port by getting a free Message Frame Address (MFA), the value of which determines whether the IOP is ready to communicate. A GetStatus message is subsequently posted to the IOP. After a reply has been read, InitOutbound message will be sent to the IOP next in step 72 to initialize the Outbound Message Queue of the IOP. Then, a plurality of message frames, which are locations in the memory that contain $I_2O$ messages, are allocated. Once the IOP responds to the message, the IOP loads the MFAs to the free outbound queue. The IOP is now changed into a Hold State. In step 74, by sending a GetHRT message, the BIOS tries to determine which devices on the I$_2$O subsystem are I$_2$O devices. A hardware Resource Table (HRT) from the IOP contains entries for each device the IOP sees when it performs its own subsystem scan. As the BIOS initializes the I$_2$O subsystem, it builds a list of IOPs in the subsystem and their corresponding First In First Out (FIFO) addresses. This list is basically a memory held in PCI memory space for hidden devices. This list is called an I$_2$O system table. After the I$_2$O system table is fully completed, as in step 76, the BIOS sends a SetSysTab message to each IOP on the I$_2$O system table to transfer every IOP into the Ready State. Once the reply of the SetSysTab has arrived, the BIOS sends a EnableSys message to start changing all the IOPs into the Operational State in step 78. In step 80, the BIOS further gathers Logic Configuartion Tables (LCT) from all IOPs by sending out a LCTNotify request message. A LCT indicates the I$_2$O class for each device under the control of a respective IOP, and also identifies which devices are unclaimed. For the purpose of the present disclosure, I$_2$O Random Block Storage Devices Class is the only class that is of concern. After a particular LCT for a corresponding IOP is read by the BIOS, the I$_2$O subsystem is now fully in an Operational State.

Once an IOP is ready to operate, the BIOS then searches for a bootable I$_2$O device under its control. First, in step 82, the BIOS checks the LCT to seek an unclaimed Random Block Storage device. Once found, a claim message is sent to claim the device for use by the BIOS in step 84. Next, in step 86, the BIOS verifies the status of the device by sending out a BsaStatusCheck message. If the status check is successful, then, in step 88, the BIOS reads the boot sector by sending the device a BsaBlockRead message. If not, another unclaimed I$_2$O device will be sought. In order to read the boot sector, the BIOS INT 13h code must be modified to support the I$_2$O devices. When the BIOS finishes examining the data reply returned by the device for the BsaBlockRead message, it can determine whether the device is bootable, as shown in step 90. If it is, the BIOS acknowledges the I$_2$O device as bootable, and sends an Execboot-DeviceSet message over to the IOP. This message will set the BootDevice field of the LCT to the I$_2$O Target ID (TID) of this device. If the device is not bootable, then the BIOS will simply search for another unclaimed Random Block Storage device as a candidate. Finally in step 92, if a bootable I$_2$O device has been identified, the BIOS assigns a drive name to the device, such as "C:", and sends a ExecBlockInfoSet message to the IOP to update its LCT. Consequently, this I$_2$O device is ready for booting the OS. It needs to be noticed that if the BIOS predetermines that the boot sequence is a sequential boot, then the BIOS will boot the OS from the first found I$_2$O device or other bootable non-I$_2$O device, and no other I$_2$O subsystem will be initialized. However, if the BIOS intends to have selective boot sequence, then every I$_2$O subsystem installed will be initialized regardless of the location of the I$_2$O device in the PCI bus.

Referring now to FIG. 6, a flow diagram illustrates the I$_2$O INT 13h handler hooking process. Once a bootable I$_2$O device is found, the I$_2$O INT 13h handler must be hooked in order to use the IOP messaging interface established during the I$_2$O subsystem initialization process to communicate with all the Random Block Storage devices in the I$_2$O subsystem. In step 100, the BIOS checks whether the I$_2$O device is the first disk in the computer system. If it is, the BIOS redirect the floppy drive INT 13h handler to INT 40h in step 102, and subsequently hook the I$_2$O INT 13h handler in step 104. If the I$_2$O device is not the first disk, then no redirection of the floppy drive handler should be done, and the original INT 13h handler is saved in step 106. Eventually in step 108, the saved INT 13h handler is chained in the INT 13h chain.

With respect to FIG. 7, it is in the contemplation of the present disclosure to use the Extended BIOS Data Area (EBDA) for I$_2$O data buffer and IOP outbound message frame pool. A regular EDBA 110 only contains normally 1 KB of data segment 112 in a 640 KB memory, and thus the BIOS can easily allocate 4 KB memory to create an EDBA with I$_2$O device accommodation, identified by numeral 114. The old 1 KB data segment 112 is pressed down, 3 KB memory space is labeled for I$_2$O outbound message frame pool 116, and 1 KB memory space for an I$_2$O data segment 118.

A principal advantage according to the present disclosure is that with the implementation of a Virtual Option ROM, an I$_2$O device having no Option ROM originally associated thereto can now be recognized by the computer system as a bootable device in the Setup mode. Consequently, a user can freely select any I$_2$O device as the system boot device for booting the OS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system supporting an Intelligent I/O architecture and having at least one bootable non-Intelligent I/O data storage, said computer system comprising:

at least one Intelligent I/O subsystem;

at least one Intelligent I/O device having no Option ROM associated therewith, said at least one Intelligent I/O device residing within said Intelligent I/O subsystem, configured to communicate with a first operating system using a messaging layer, and configured to communicate with a second operating system using the messaging layer;

a data storage detector for identifying the Intelligent I/O device;

an Intelligent I/O subsystem initializer for configuring said Intelligent I/O subsystem; and a Virtual Option ROM stored in a computer system BIOS boot sequence code for enabling said computer system to boot from said at least one Intelligent I/O device subsequent to said at least one Intelligent I/O device being identified by said data storage detector using the messaging layer and said Intelligent I/O subsystem being fully configured by said Intelligent I/O subsystem initializer using the messaging layer.

2. The system of claim 1, wherein said data storage detector further identifies a bootable Intelligent I/O device.

3. The system of claim 1, wherein said data storage detector further identifies an unbootable Intelligent I/O device.

4. The system of claim 1, wherein said Virtual Option ROM enables the computer system BIOS boot sequence code to boot said computer system from said Intelligent I/O device in a sequential boot process, wherein the corresponding physical locations of the non-Intelligent I/O data storage and said at least one Intelligent I/O device in said computer system determine a selection of either a bootable non-Intelligent I/O data storage or said at least one Intelligent I/O device as a system boot device.

5. The system of claim 1, wherein said Virtual Option ROM enables said computer system BIOS boot sequence code to select said at least one Intelligent I/O device as a bootable device to boot said computer system in a selective boot process regardless of a physical location of said at least one Intelligent I/O device in said computer system with reference to other bootable non-Intelligent I/O data storage.

6. The system of claim 1, wherein said at least one Intelligent I/O device is an Intelligent I/O disk drive.

7. A computer system supporting an Intelligent I/O architecture and having at least one bootable non-intelligent I/O data storage, said computer system comprising:
 at least one Intelligent I/O device having no Option ROM associated therewith, configured to communicate with a first operating system using a messaging layer, and configured to communicate with a second operating system using the messaging layer; and
 a Virtual Option ROM stored in a computer system BIOS boot sequence code for enabling said computer system to boot from said at least one Intelligent I/O device.

8. The system of claim 7, wherein said computer system further comprises an Intelligent I/O subsystem initializer for configuring said at least one Intelligent I/O device using the messaging layer.

9. The system of claim 7, wherein said Virtual Option ROM enables said computer system BIOS boot sequence code to boot said computer system from said at least one Intelligent I/O device in a sequential boot process, wherein physical locations of the non-Intelligent I/O data storage and said at least one Intelligent I/O device in said computer system determine a selection of either a bootable non-Intelligent I/O data storage or said at least one Intelligent I/O device as a system boot device.

10. The system of claim 7, wherein said Virtual Option ROM enables said computer system BIOS boot sequence code to select said at least one Intelligent I/O device as a bootable data storage to boot said computer system in a selective boot process regardless of a physical location of said at least one Intelligent I/O device in a computer system with reference to other bootable non-Intelligent data storage.

11. The system of claim 10, wherein said Intelligent I/O device is selected by a user during a computer Setup process as the system boot device, said Intelligent I/O device being able to boot said computer system with the assistance of said Virtual Option ROM.

12. The system of claim 7, wherein said computer system further comprises a data storage device detector for identifying said at least one Intelligent I/O device using the messaging layer.

13. The system of claim 12, wherein said data storage detector further identifies a bootable Intelligent I/O device.

14. The system of claim 12, wherein said data storage detector further identifies an unbootable Intelligent I/O device.

15. A computer system supporting an Intelligent I/O architecture and having at least one bootable non-intelligent I/O data storage, said computer system comprising:
 at least one Intelligent I/O device subsystem, said at least one Intelligent I/O device subsystem having at least one Intelligent I/O device with no Option ROM associated therewith, configured to communicate with a first operating system using a messaging layer, and configured to communicate with a second operating system using the messaging layer;
 a data storage detecting circuit for identifying the at least one Intelligent I/O device;
 an Intelligent I/O device subsystem initializing circuit for configuring said at least one Intelligent I/O device subsystem; and
 a memory storing a Virtual Option ROM for enabling said computer system to boot from said at least one Intelligent I/O device after the at least one Intelligent I/O device is identified using the messaging layer and said at least one Intelligent I/O device subsystem is configured using the messaging layer.

16. The system of claim 15, wherein the at least one Intelligent I/O data device is an Intelligent I/O disk drive.

17. The system of claim 15, wherein said memory storing a Virtual Option ROM enables a BIOS boot sequence code to boot said computer system from said at least one Intelligent I/O device in a sequential boot process, wherein physical locations of said bootable non-Intelligent I/O data storage and the at least one Intelligent I/O device in said computer system determine a selection of either said at least one bootable non-Intelligent I/O data storage or the at least one Intelligent I/O device as a system boot device.

18. The system of claim 15, wherein said memory storing a Virtual Option ROM enables a BIOS boot sequence code to select the at least one Intelligent I/O device as a bootable data storage to boot said computer system in a selective boot process regardless of a physical location of the at least one Intelligent I/O device in a computer system with reference to said at least one bootable non-Intelligent I/O data storage.

19. The system of claim 18, wherein said Intelligent I/O device is selected by a user during a computer Setup process as a system boot device, said Intelligent I/O device being able to boot said computer system with the assistance of said Virtual Option ROM.

20. The system of claim 15, wherein said data storage detecting circuit further identifies a bootable Intelligent I/O device.

21. The system of claim 15, wherein said data storage detecting circuit further identifies an unbootable Intelligent I/O device.

22. A method for booting a computer system implemented with at least one Intelligent I/O device with no Option ROM associated therewith, configured to communicate with a first operating system using a messaging layer, and configured to communicate with a second operating system using the messaging layer, said computer system including at least one bootable non-Intelligent I/O data storage and at least one Intelligent I/O device subsystem, said method comprising:
 detecting the at least one Intelligent I/O device;
 establishing a Virtual Option ROM for the at least one Intelligent I/O device in a computer system BIOS boot sequence code;
 initializing the at least one Intelligent I/O device subsystem wherein the at least one Intelligent I/O device resides; and
 booting the computer system from the at least one Intelligent I/O device with the assistance of the Virtual Option ROM after detecting the at least one Intelligent I/O device using the messaging layer and initializing the at least one Intelligent I/O device subsystem using the messaging layer.

23. The method of claim 22, wherein the at least one Intelligent I/O device is an Intelligent I/O disk drive.

24. The method of claim 22, wherein said step of booting the computer system from the at least one Intelligent I/O device is a sequential boot process, wherein physical locations of the bootable non-Intelligent I/O data storage and the at least one Intelligent I/O device in the computer system determine a selection of either a bootable non-Intelligent I/O data storage or the at least one Intelligent I/O device as a system boot device.

25. The method of claim 22, wherein said step of booting the computer system from the at least one Intelligent I/O device is a selective boot process, further wherein the Intelligent I/O device being selected as a system boot device to boot the computer system regardless its physical location in a computer system.

26. The method of claim 22, wherein said step of initializing at least one Intelligent I/O device subsystem further includes the steps of:

checking the status of at least one Intelligent I/O device platform of the at least one Intelligent I/O device subsystem;

initializing outbound message queues of the at least one Intelligent I/O device platform;

determining the at least one Intelligent I/O device associated with the at least one Intelligent I/O device platform;

sequentially setting the at least one Intelligent I/O device platform into a Ready state and then into an Operational state;

claiming at least one unclaimed Intelligent I/O device controlled by the at least one Intelligent I/O device platform for the purpose of booting the computer system;

obtaining a Logic Configuration Table from the at least one Intelligent I/O device platform;

searching for at least one unclaimed Intelligent I/O device of Random Block Storage Device Class in the Logic Configuration Table;

determining the bootability of the at least one unclaimed Intelligent I/O device; and configuring the at least one unclaimed Intelligent I/O device as a system boot device.

27. A computer program stored on a computer-readable medium for executions by a computer system for booting the computer system from at least one Intelligent I/O device having no Option ROM associated therewith, configured to communicate with a first operating system using a messaging layer, and configured to communicate with a second operating system using the messaging layer, said computer system including at least one bootable non-Intelligent I/O data storage and at least one Intelligent I/O device subsystem, said computer program comprising:

instructions for establishing a Virtual Option ROM;

instructions for detecting the at least one Intelligent I/O device using the messaging layer;

instructions for initiating the at least one Intelligent I/O device subsystem using the messaging layer wherein the at least one Intelligent I/O device resides; and instructions for booting the computer system from the Intelligent I/O device with the assistance of the Virtual Option ROM.

28. The program of claim 27, wherein said instructions for booting the computer system are for a sequential boot process, wherein physical locations of the bootable non-Intelligent I/O data storage and the at least one Intelligent I/O device in the computer system determine a selection of either the at least one bootable non-Intelligent I/O data storage or the at least one Intelligent I/O device as a system boot device.

29. The program of claim 27, wherein said instructions for booting the computer system are for a selective boot process, further wherein the at least one Intelligent I/O device being selected as a system boot device to boot the computer system regardless the physical location of the at least one Intelligent I/O device in the computer system.

30. The program of claim 27, wherein said computer program is located in the computer system BIOS boot sequence code.

* * * * *